A. W. WESTCOTT.
MAGNETIC FISHING TOOL.
APPLICATION FILED MAY 15, 1918.
1,310,169.
Patented July 15, 1919.
2 SHEETS—SHEET 2.
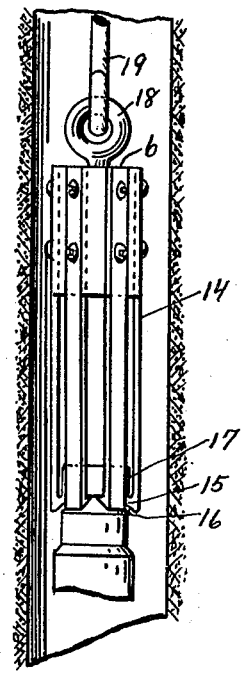
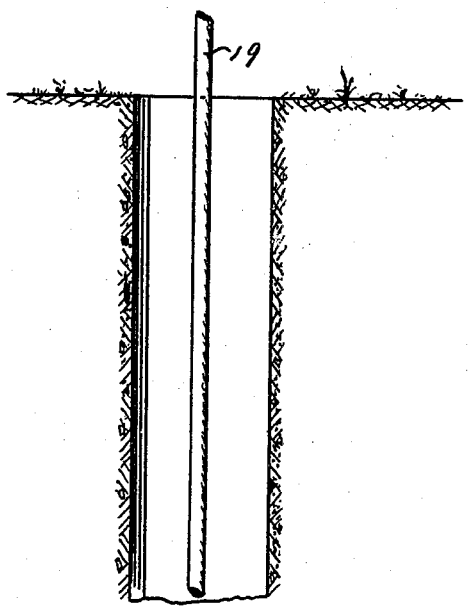
Fig. 4
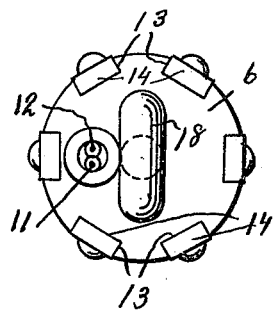
Fig. 5
INVENTOR
ARTHUR W. WESTCOTT.
by Martell & Co.
his ATTORNEYS.

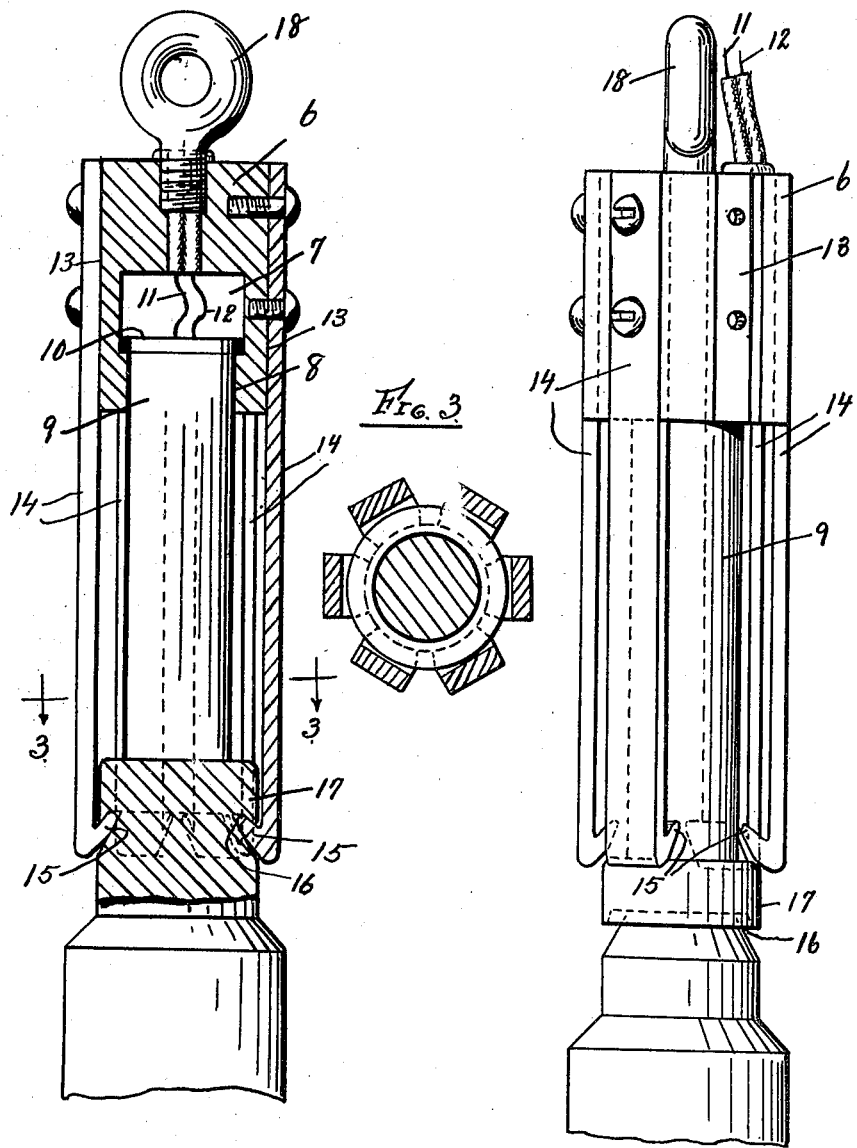

UNITED STATES PATENT OFFICE.

ARTHUR W. WESTCOTT, OF LOS ANGELES, CALIFORNIA.

MAGNETIC FISHING-TOOL.

1,310,169.  Specification of Letters Patent.  Patented July 15, 1919.

Application filed May 15, 1918. Serial No. 234,641.

*To all whom it may concern:*

Be it known that I, ARTHUR W. WESTCOTT, residing at Los Angeles, in the county of Los Angeles and State of California, have invented certain new and useful Improvements in Magnetic Fishing-Tools, of which the following is a specification.

My invention relates primarily to a tool for use in fishing drills from deep wells after the same have become accidentally detached from the drill rods, and the object thereof is to provide a device for this purpose which will enable the lost tools to be easily and quickly recovered without damage thereto.

A further object is to provide a device of the above character which will be cheap, simple and efficient and positive in operation, and which can be easily and quickly placed in position for use.

Other objects and advantages will appear hereinafter and while I have shown and will describe the preferred form of my invention, it will be understood that I do not limit myself to such preferred form but that various changes and adaptations may be made therein without departing from the spirit of my invention.

In the drawings:

Figure 1 is a side elevation of my improved device, with parts omitted for clearness of illustration, and a fragment of the tool.

Fig. 2 is a central longitudinal section of Fig. 1.

Fig. 3 is a section on the line 3—3 of Fig. 2.

Fig. 4 is a top plan of my device.

Fig. 5 is a view of my device as it appears in operation.

My device comprises a head 6 of any suitable material preferably non-magnetic, provided with pocket 7 substantially centrally thereof.

The lower end of pocket 7 is connected to atmosphere by a port or opening 8 slightly smaller in diameter than pocket 7, in which is slidably mounted a solenoid magnet 9 at one end. A cap 10 is secured upon the upper end of magnet 9 within pocket 7 and is of the same diameter as pocket 7, and serves to hold magnet 9 in its position of use. The upper end of magnet 9 is connected by wires 11 and 12 to a source of current, not shown, which wires extend through the upper end of head 6, being properly insulated therefrom in any suitable manner. Formed in the outer periphery of head 6 are a plurality of rectangular sockets 13, of which I have shown 6 but more or less may be used as desired, in which sockets are mounted the upper ends of a plurality of downwardly depending hook members 14 the lower ends of which terminate in hooks 15. Hooks 15 are adapted to engage in the groove 16 formed in the head 17 of the drill and draw the same upwardly. An eye bolt 18 is mounted in the upper end of head 6 to which is attached one end of a hoisting cable 19 whereby the tool may be lowered into or raised out of the well.

In the use of my device when a tool has become detached the fishing tool is lowered down the well until the lower end of the magnet 9 contacts with the head of the tool, as best shown in Fig. 1, with the hooks resting upon the edge of the top face of the drill head. The current is then turned on which energizes the magnet causing the same to jerk head 6 and hook members 14 and hooks 15 downwardly. This causes the hooks to spread outwardly over the head as they move downwardly until the points of the hooks 15 enter groove 16, it being understood that hook members 14 and hooks 15 are of resilient material preferably spring steel. The current is then cut off and the fishing tool hoisted upwardly carrying the drill or tool along with it by means of hooks 15 and groove 16.

Having described my invention what I claim is:

1. A magnetic fishing tool comprising a head; a magnet slidably mounted at one end in the lower end of said head to slide vertically; a plurality of flexible fingers secured at one end to said head to extend parallel with said magnet but spaced therefrom, the lower ends of said fingers being bent inwardly and upwardly to form hooks; a connection from the upper end of said magnet to a source of energy; and means extending upwardly from said head adapted for connection to a carrying means.

2. A magnetic fishing tool comprising a head; an annular chamber in the lower end of said head; a magnet having one end slidably mounted in said chamber and extending downwardly therefrom; a plurality of flexible fingers detachably mounted at their upper ends to the outer periphery of said head concentric with said magnet and extending parallel therewith; inwardly extending hooks on the lower ends of said fingers adapted for engagement with a recess in the head of a well tool, said fingers being longer than said magnet; a source of energy for said magnet; and means mounted on the upper end of said head for connection to a carrying means.

3. A magnetic fishing tool comprising a head provided with an annular chamber in the lower end thereof; a magnet slidably mounted at its upper end in said chamber to extend vertically; flexible fingers detachably secured at their upper ends to said head concentric with said magnet but spaced therefrom and terminating at their lower ends in hooks adapted for engagement with the head of a tool; and means to energize said magnet.

In witness that I claim the foregoing I have hereunto subscribed my name this 22 day of April 1918.

ARTHUR W. WESTCOTT.

Copies of this patent may be obtained for five cents each, by addressing the "Commissioner of Patents, Washington, D. C."